(12) United States Patent
Schwartz et al.

(10) Patent No.: US 7,548,572 B2
(45) Date of Patent: Jun. 16, 2009

(54) STABILIZED SOLID-STATE LASER GYROSCOPE

(75) Inventors: Sylvain Schwartz, Paris (FR); Gilles Feugnet, Les Ulis (FR); Jean-Paul Pocholles, La Norville (FR)

(73) Assignee: Thales (FR)

( * ) Notice: Subject to any disclaimer, the term of this patent is extended or adjusted under 35 U.S.C. 154(b) by 149 days.

(21) Appl. No.: 10/550,514

(22) PCT Filed: Mar. 23, 2004

(86) PCT No.: PCT/EP2004/050349

§ 371 (c)(1),
(2), (4) Date: Sep. 23, 2005

(87) PCT Pub. No.: WO2004/094952

PCT Pub. Date: Nov. 4, 2004

(65) Prior Publication Data

US 2006/0256828 A1      Nov. 16, 2006

(30) Foreign Application Priority Data

Mar. 25, 2003 (FR) .................................. 03 03645

(51) Int. Cl.
*H01S 3/083* (2006.01)
(52) U.S. Cl. .............................. 372/94; 372/92; 372/93; 372/98; 356/459; 356/460
(58) Field of Classification Search .................. 372/94, 372/92, 93, 98; 356/459, 460
See application file for complete search history.

(56) References Cited

U.S. PATENT DOCUMENTS 3,649,931 A   3/1972 Macek
3,862,803 A * 1/1975 Yntema et al. ............... 356/467
3,867,034 A * 2/1975 Aronowitz ................... 356/472
4,955,034 A * 9/1990 Scerbak ........................ 372/94
5,177,764 A * 1/1993 Nilsson ........................ 372/94
5,347,360 A * 9/1994 Holz ........................... 356/467
5,960,022 A * 9/1999 Halldorsson et al. .......... 372/94
6,731,423 B1* 5/2004 Brasseur et al. ............. 359/334
2004/0202222 A1  10/2004 Pocholle et al.

FOREIGN PATENT DOCUMENTS

WO           91/10273        7/1991

* cited by examiner

*Primary Examiner*—Minsun Harvey
*Assistant Examiner*—Yuanda Zhang
(74) *Attorney, Agent, or Firm*—Lowe Hauptman Ham & Berner, LLP

(57) ABSTRACT

The field of the invention is that of solid-state laser gyros. One of the major problems inherent in this technology is that the optical cavity of this type of laser is by its nature highly unstable. To reduce this instability, the invention proposes to introduce controlled optical losses into the cavity that depend on the polarization direction by placing in the cavity an optical assembly comprising a polarizing element, a first element exhibiting a reciprocal effect that acts on the polarization of the wave and a second element exhibiting a nonreciprocal effect that also acts on the polarization of the wave, at least one of these two effects being variable, and to electronically slave these losses to the difference in intensity between the counterpropagating modes. Several devices are described that implement either fixed reciprocal effects combined with variable nonreciprocal effects, or vice versa. These devices apply in particular to monolithic cavity lasers and especially to lasers of the neodymium-doped YAG type and also to fiber cavity lasers.

10 Claims, 11 Drawing Sheets

FRONT VIEW         SIDE VIEW

STABILIZED SOLID-STATE LASER GYROSCOPE

CROSS-REFERENCE TO RELATED APPLICATIONS

The present Application is based on International Application No. PCT/EP2004/050349, filed on May 23, 2004, which in turn corresponds to FR 03/03645 filed on Mar. 25, 2003, and priority is hereby claimed under 35 USC §119 based on these applications. Each of these applications are hereby incorporated by reference in their entirety into the present application.

FIELD OF THE INVENTION

The field of the invention is that of solid-state laser gyros used for measuring rotation speeds. This type of equipment is used especially for aeronautical applications.

BACKGROUND OF THE INVENTION

The laser gyro, developed some thirty years ago, is widely used on a commercial scale at the present time. Its principle of operation is based on the Sagnac effect, which induces a frequency difference $\Delta\nu$ between the two optical transmission modes that propagate in opposite directions, called counterpropagating modes, of a bidirectional laser ring cavity undergoing a rotational motion. Conventionally, the frequency difference $\Delta\nu$ is equal to:

$$\Delta\nu = 4A\Omega/\lambda L$$

where: L and A are the length and the area of the cavity, respectively: $\lambda$ is the laser emission wavelength excluding the Sagnac effect; and $\Omega$ is the rotation speed of the assembly.

The value of $\Delta\nu$ measured by spectral analysis of the beat of the two emitted beams is used to determine the value of $\Omega$ very accurately.

It may also be demonstrated that the laser gyro operates correctly only above a certain rotation speed needed to reduce the influence of intermodal coupling. The rotation speed range lying below this limit is conventionally called the blind zone.

The condition for observing the beat, and therefore for the operation of the laser gyro, is the stability and relative equality of the intensities emitted in the two directions. This is not a priori an easy thing to achieve because of the intermodal competition phenomenon, which means that one of the two counterpropagating modes may have a tendency to monopolize the available gain, to the detriment of the other mode.

DESCRIPTION OF THE PRIOR ART

This problem is solved in standard laser gyros by the use of a gaseous amplifying medium, generally a helium/neon mixture operating at room temperature. The gain curve of the gas mixture exhibits Doppler broadening due to the thermal agitation of the atoms. The only atoms capable of delivering gain to a given frequency mode are thus those whose velocity induces a Doppler shift in the transition frequency, which brings the atom to resonance with the mode in question. Forcing the laser emission to take place other than at the center of the gain curve (by piezoelectric adjustment of the optical path length) ensures that the atoms at resonance with the cavity have a non-zero velocity. Thus, the atoms that can contribute to the gain in one of the two directions have velocities opposite those of the atoms that can contribute to the gain in the opposite direction. The system therefore behaves as if there were two independent amplifying media, one for each direction. Since intermodal competition has thus disappeared, stable and balanced bidirectional emission occurs (in practice, to alleviate other problems, a mixture consisting of two different neon isotopes is used).

However, the gaseous nature of the amplifying medium is a source of technical complications when producing the laser gyro (especially because of the high gas purity required) and of premature wear during use (gas leakage, deterioration of the electrodes, high voltage used to establish the population inversion, etc.).

At the present time, it is possible to produce a solid-state laser gyro operating in the visible or the near infrared using, for example, an amplifying medium based on neodymium-doped YAG (yttrium aluminum garnet) crystals instead of the helium/neon gas mixture, the optical pumping then being provided by diode lasers operating in the near infrared. It is also possible to use, as amplifying medium, a semiconductor material, a crystalline matrix or a glass doped with ions belonging to the class of rare earths (erbium, ytterbium, etc.). Thus, all the problems inherent with the gaseous state of the amplifying medium are de facto eliminated. However, such a construction is made very difficult to achieve due to the homogeneous character of the broadening of the gain curve of the solid-state media, which induces very strong intermodal competition and because of the existence of a large number of different operating regimes, among which the intensity-balanced bidirectional regime, called the "beat regime" is one very unstable particular case (N. Kravtsov and E. Lariotsev, *Self-modulation oscillations and relaxations processes in solid-state ring lasers*, Quantum Electronics 24 (10), 841-856 (1994)). This major physical obstacle has greatly limited hitherto the development of solid-state laser gyros.

To alleviate this drawback, one technical solution consists in attenuating the effects of the competition between counterpropagating modes in a solid-state ring laser by introducing optical losses into the cavity that depend on the direction of propagation of the optical mode and on its intensity. The principle is to modulate these losses by a feedback device according to the difference in intensity between the two transmitted modes in order to favor the weaker mode to the detriment of the other, so as constantly to slave the intensity of the two counterpropagating modes to a common value.

In 1994, a feedback device was proposed in which the losses were obtained by means of an optical assembly essentially composed of an element exhibiting a variable Faraday effect and of a polarizing element (A. V. Dotsenko and E. G. Lariontsev, *Use of a feedback circuit for the improvement of the characteristics of a solid-state ring laser*, Soviet Journal of Quantum Electronics 14 (1), 117-118 (1984) and A. V. Dotsenko, L. S. Komienko, N. V. Kravtsov, E. G. Lariontsev, O. E. Nanii and A. N. Shelaev, *Use of a feedback loop for the stabilization of a beat regime in a solid-state ring laser*, Soviet Journal of Quantum Electronics 16 (1), 58-63 (1986)).

The principle of this feedback device is illustrated in FIG. 1. It consists in introducing, into a ring cavity 1 consisting of three mirrors 11, 12 and 13 and an amplifying medium 19, an optical assembly placed in the path of the counterpropagating optical modes 5 and 6, said assembly consisting of a polarizing element 71 and an optical rod 72 exhibiting the Faraday effect, wound with an induction coil 73. At the output of the cavity, the two optical modes 5 and 6 are sent to a measurement photodiode 3. One portion of these beams 5 and 6 is taken off by means of the two semireflecting plates 43 and sent to the two photodetectors 42. The signals output by these photodetectors are representative of the light intensity of the two counterpropagating optical modes 5 and 6. Said signals are sent to an electronic feedback module 4, which generates an electrical current proportional to the difference in light intensity between the two optical modes. This electrical current determines the value of the losses inflicted at each of the counterpropagating modes 5 and 6. If one of the beams has a higher light intensity than the other, its intensity will be attenuated more, so as to bring the output beams to the same intensity level. Thus, the bidirectional regime is intensity-stabilized.

A solid-state laser gyro can operate, according to this principle, only if the parameters of the feedback device are matched to the dynamics of the system. In order for the feedback device to be able to give correct results, three conditions must be fulfilled:

the additional losses introduced into the cavity by the feedback device must be of the same order of magnitude as the intrinsic losses in the cavity;

the reaction rate of the feedback device must be greater than the rate of variation of the intensities of the emitted modes so that the feedback operates satisfactorily; and finally, the feedback force of the feedback device must be sufficient for the effect induced in the cavity to effectively compensate for the intensity variations.

The Maxwell-Bloch equations are used to determine the complex amplitudes $E_{1,2}$ of the fields of the counterpropagating optical modes, and also the population inversion density N. These are obtained using a semi-conventional model (N. Kravtsov and E. Lariotsev, *Self-modulation oscillations and relaxations processes in solid-state ring lasers*, Quantum Electronics 24(10), 841-856 (1994)).

These equations are:

$$dE_{1,2}/dt = -(\omega/2Q_{1,2})E_{1,2} + i(m_{1,2}/2)E_{2,1} \pm i(\Delta\nu/2)E_{1,2} + (\sigma/2T)(E_{1,2}\int lNdx + E_{2,1}\int lNe^{\pm 2ikx}dx)$$ Equation 1:

$$dN/dt = W - (N/T_1) - (a/T_1)N|E_1 e^{-ikx} + E_2 e^{ikx}|^2$$ Equation 2 where:

the indices 1 and 2 are representative of the two counterpropagating optical modes;

ω is the laser emission frequency excluding the Sagnac effect;

$Q_{1,2}$ are the Q-factors of the cavity in the two propagation directions;

$m_{1,2}$ are the backscattering coefficients of the cavity in the two propagation directions;

σ is the effective laser emission cross section;

l is the length of the gain medium traveled,

T=L/c is the transit time of each mode of the cavity;

k=2π/λ is the norm of the wave vector;

W is the pumping rate;

$T_1$ is the lifetime of the excited level; and a, the saturation parameter, is equal to $\sigma T_1/8\pi\hbar\omega$.

The right-hand side of equation 1 has four terms. The first term corresponds to the variation in the field due to the losses in the cavity, the second term corresponds to the variation in the field induced by the backscattering of one mode on the other mode in the presence of scattering elements present inside the cavity, the third term corresponds to the variation in the field due to the Sagnac effect, and the fourth term corresponds to the variation in the field due to the presence of the amplifying medium. This fourth term has two components, the first corresponding to the stimulated emission and the second to the backscattering of one mode on the other mode in the presence of a population inversion grating within the amplifying medium.

The right-hand side of equation 2 has three terms, the first term corresponding to the variation in the population inverse density due to the optical pumping, the second term corresponding to the variation in the population inverse density due to the stimulated emission and the third term corresponding to the variation in the population inversion density due to the spontaneous emission.

The mean losses $P_c$ due to the cavity after a complete rotation of the optical mode are consequently:

$P_c = \omega T/2Q_{1,2}$ according to the first term of the right-hand side of equation 1.

The losses introduced by the feedback devices $P_f$ must be of the same order of magnitude as these mean losses $P_c$. In general, these losses are of the order of 1 percent.

The reaction rate of the feedback device may be characterized by the bandwidth γ of said feedback device. It has been demonstrated (A. V. Dotsenko and E. G. Lariontsev, *Use of a feedback circuit for the improvement of the characteristics of a solid-state ring laser*, Soviet Journal of Quantum Electronics 14 (1), 117-118 (1984) and A. V. Dotsenko, L. S. Komienko, N. V. Kravtsov, E. G. Lariontsev, O. E. Nanii and A. N. Shelaev, *Use of a feedback loop for the stabilization of a beat regime in a solid-state ring laser*, Soviet Journal of Quantum Electronics 16 (1), 58-63 (1986)), using equations 1 and 2, that a sufficient condition for establishing a stable bidirectional regime above the rotation speed can be written as:

$$\gamma \gg \eta\omega/[Q_{1,2}(\Delta\nu T_1)^2]$$

where $\eta = (W - W_{threshold})/W$ and η corresponds to the relative pumping rate above the threshold $W_{threshold}$.

To give an example, for a relative pumping rate η of 10%, an optical frequency ω of $18 \times 10^{14}$, a quality factor $Q_{1,2}$ of $10^7$, a frequency difference Δν of 15 kHz and an excited state lifetime $T_1$ of 0.2 ms, the bandwidth γ must be greater than 40 kHz.

In order for the loop to operate correctly, the following relationship must also be satisfied:

$$(\Delta\nu T_1)^2 \gg 1.$$

Conventionally, the feedback force of the feedback device q is defined in the following manner:

$$q = [(Q_1 - Q_2)/(Q_1 + Q_2)]/[(I_2 - I_1)/(I_2 + I_1)]$$

where $I_1$ and $I_2$ are the light intensities of the two counterpropagating modes.

In this type of application, it has been demonstrated that the parameter q must be greater than $1/(\Delta\nu T_1)^2$ in order for the feedback device to be able to operate correctly.

SUMMARY OF THE INVENTION

The object of our invention is to propose a stabilizing device for a solid-state gyro laser, which consists of a feedback system that inflicts optical losses that depend on the propagation direction, being based on the combination of three physical effects, namely the reciprocal rotation, the nonreciprocal rotation and the polarization. The stabilizing device according to the invention makes it possible to obtain the conditions needed for proper operation of the gyro laser.

There is a nonreciprocal optical effect in an optical component when, for light having an initial polarization state, the polarization state of the light is different from this initial state after a round trip in said component. Materials exhibiting the Faraday effect are materials which, when they are subjected to a magnetic field, rotate the direction of polarization of a linearly polarized beam passing through it.

This effect is not reciprocal. Thus, the same beam traveling in the opposite direction will undergo a rotation in its polarization direction in the same sense. This principle is illustrated in FIG. 2a. The polarization direction 51 of the linearly polarized beam 5 rotates through an angle β when it passes through the component 8 exhibiting the Faraday effect in the forward sense (upper diagram in FIG. 2a). If an identical beam 6 propagating in the opposite sense, the direction of polarization of which is initially rotated through β, is reinjected into the component exhibiting the Faraday effect, its polarization direction 51 again rotates through the angle β on passing through the component, the total angle of rotation then being 2β after a round trip (central diagram in FIG. 2a). In a conventional component 7 exhibiting a reciprocal effect, the polarization direction 51 would be rotated through −β, so as to resume its initial position (lower diagram in FIG. 2a).

More precisely, the subject of the invention is a laser gyro comprising at least one optical ring cavity consisting of at least three mirrors, a solid-state amplifying medium and a feedback system, the cavity and the amplifying medium being such that two counterpropagating optical modes can propagate in opposite directions one with respect to the other inside said optical cavity, the feedback system allowing the intensity of the two counterpropagating modes to be kept almost the same, the feedback system comprising at least, inside the cavity, an optical assembly consisting of a polarizing element and a device exhibiting a nonreciprocal effect that acts on the polarization state of the counterpropagating modes, characterized in that said optical assembly also includes a device exhibiting a reciprocal effect that also acts on the polarization state of the counterpropagating modes, the feedback system comprising control means for controlling at least one of the effects of said devices exhibiting a reciprocal effect and a nonreciprocal effect.

Two broad technical choices can then be made:
 either the reciprocal effect is fixed, and in this case the nonreciprocal effect must be able to be adjusted so that the feedback device can operate;
 or the nonreciprocal effect is fixed, and in this case the reciprocal effect must be able to be adjusted so that the feedback device can operate.

BRIEF DESCRIPTION OF THE DRAWINGS

The invention will be more clearly understood and other advantages will become apparent on reading the following description given by way of non-limiting example and from the appended figures in which.

MORE DETAILED DESCRIPTION

Figure 1:
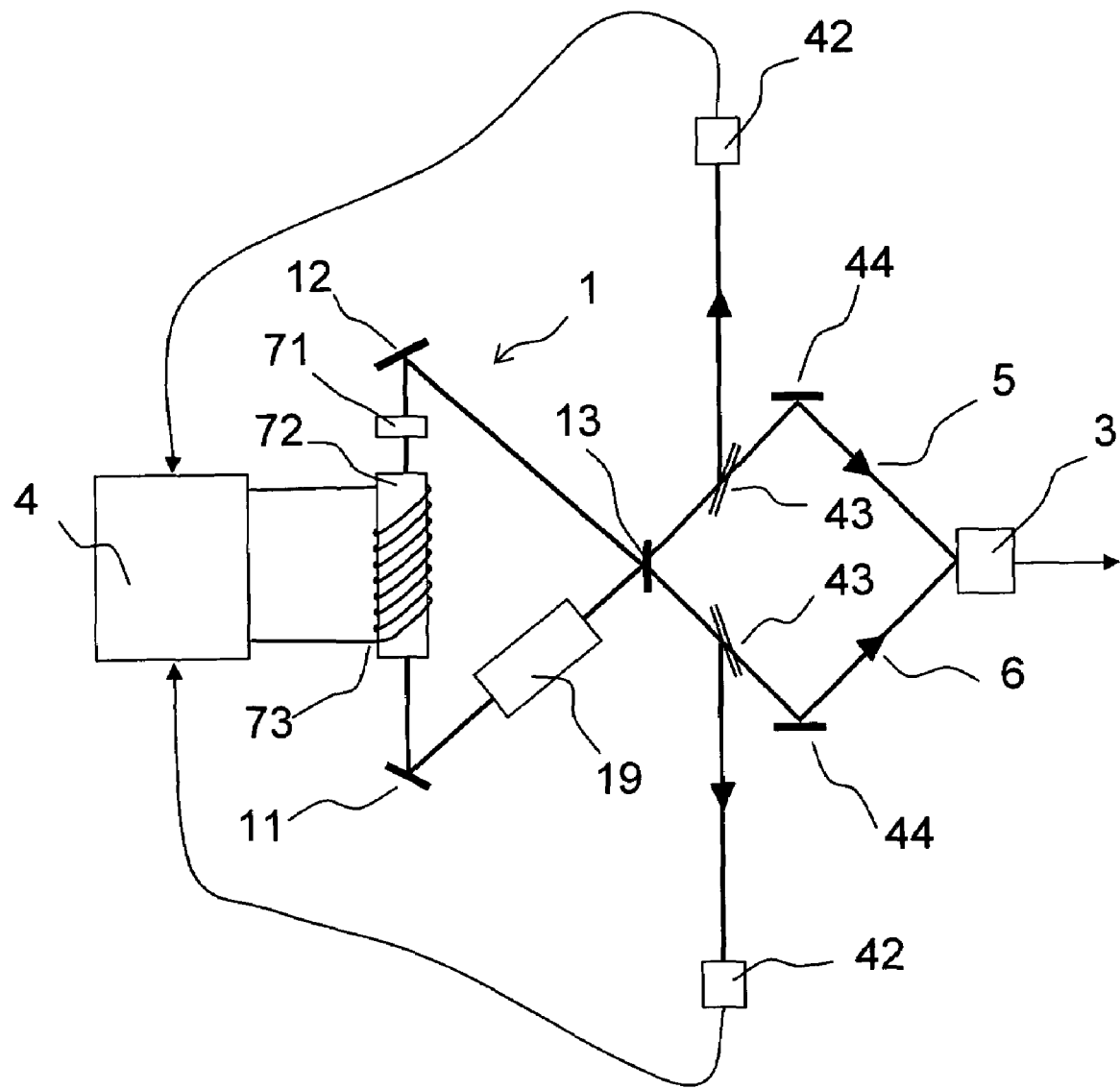
FIG. 1 shows the principle of operation of the feedback device according to the prior art.
Figure 2A:
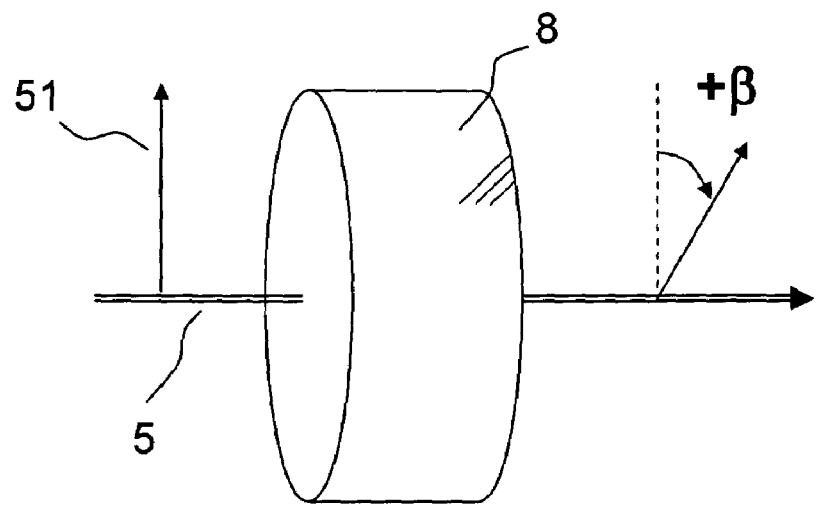
FIG. 2a shows the principle of the nonreciprocal Faraday effect.
Figure 2A:
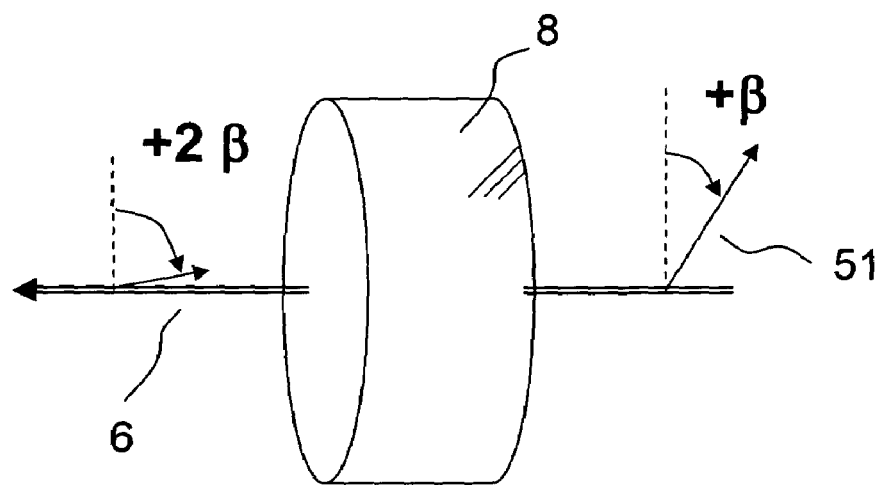
Figure 2A:
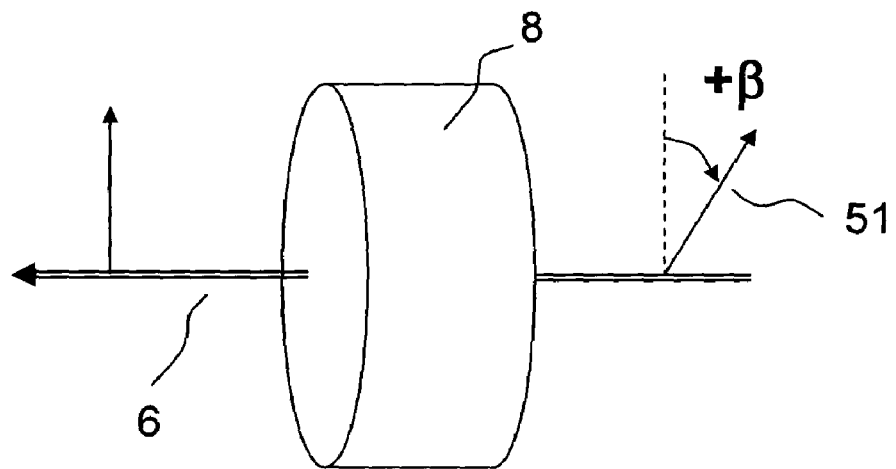
Figure 2B:
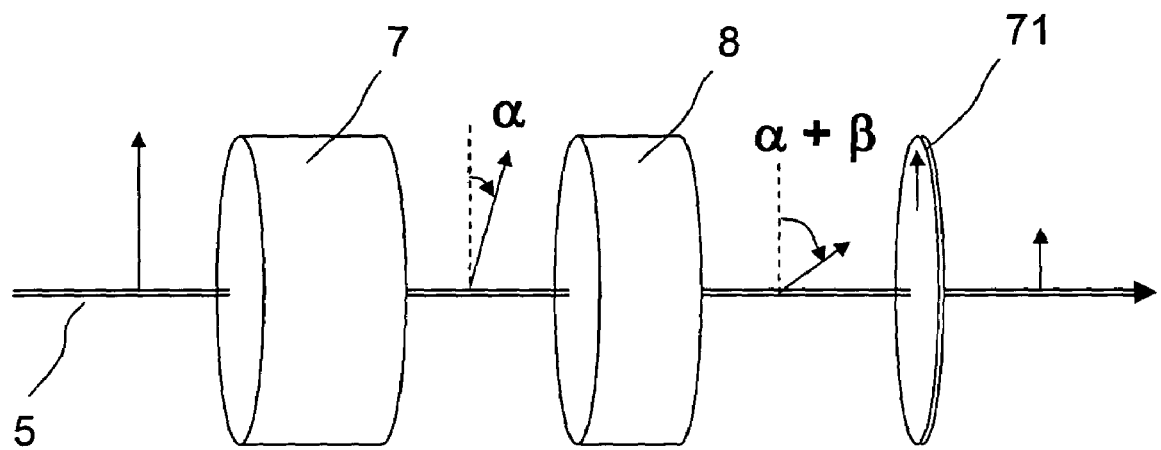
FIG. 2b shows the general principle of the device for inducing losses that depend on the propagation direction according to the invention.
Figure 2B:
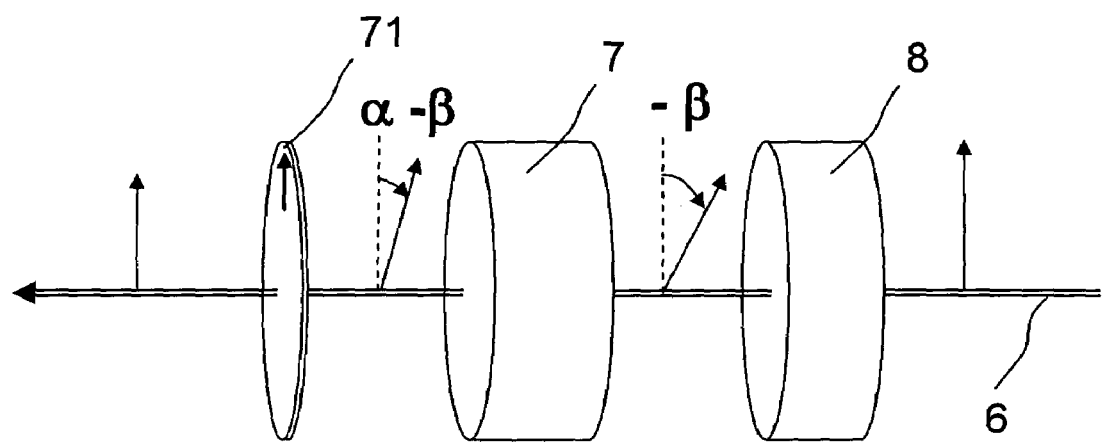

The principle of combining a reciprocal optical effect with a nonreciprocal optical effect is illustrated in the example shown in FIG. 2b, in which the reciprocal and nonreciprocal effects are simply rotations of the linear polarization. The two diagrams in this figure show a portion of a ring cavity in which two counterpropagating optical beams 5 and 6 can circulate. This cavity includes, among other things, an optical assembly consisting of a linear polarizer 71, a first element 7 exhibiting a reciprocal effect that acts on the polarization direction of the linearly polarized light and a second element 8 exhibiting a nonreciprocal effect that also acts on the polarization direction of the light. For the sake of clarity, that portion of the cavity comprising this optical assembly has been represented as a line. The polarization direction of the optical beams has been indicated by an arrow. The first element 7 rotates the polarization of the light through an angle α in the forward direction and the second element 8 rotates the polarization through an angle β, also in the forward direction. The element 7 may especially be a halfwave plate, the axis of which is rotated through an angle α/2 relative to the polarization axis of the linear polarizer 71. The element 8 may be a Faraday rotator as mentioned above. Consider a first optical beam 5 linearly polarized by the linear polarizer 71 and passing in succession through the first and second elements, as illustrated in the diagram at the top of FIG. 2b, after having passed through the first element its polarization direction has rotated through an angle α and after having passed through the second element its polarization direction has rotated through an angle $\theta_{forward}$ equal to α+β. When this beam again passes, after one complete turn, through the linear polarizer 71, its relative transmission $T_{forward}$ will be given by:

$$T_{forward} = \cos^2(\alpha + \beta).$$

Consider also, when the rotation angles are small, a relative intensity loss $P_{forward}$ given by:

$$P_{forward} = (\alpha + \beta)^2,$$

this being obtained by a second order finite expansion of the cosine function.

Consider a second optical beam 6 linearly polarized and passing in succession in the opposite direction relative to the first beam 5 through the second element and then the first element, as illustrated in the diagram at the bottom of FIG. 2b, after having passed through the second element its polarization direction has rotated through an angle β and after having passed through the first element its polarization direction has rotated through an angle $\theta_{reverse}$ equal to −α+β. When this beam passes through a linear polarizer whose axis is oriented parallel to the initial polarization direction of the beam, its relative transmission $T_{reverse}$ will be given by:

$$T_{reverse} = \cos^2(\beta - \alpha).$$

Consider also, when the rotation angles are small, a relative intensity loss $P_{reverse}$ given by:

$$P_{reverse} = (\beta - \alpha)^2,$$

this being obtained by a second order finite expansion of the cosine function.

Consequently, the losses in the reverse propagation direction are different from those recorded in the forward direction, which does indeed correspond to the desired result. It is thus possible to vary the intensities of the counterpropagating modes differently by varying one of the two rotation angles, α or β.

Of course, the above example can be generalized to any combination of a reciprocal effect and a nonreciprocal effect acting on the polarization state of the light, such that said combination can be converted into a variation in light intensity by a polarizing element. In an actual cavity, various types of components (cavity mirrors, amplifying medium, polarizers, etc.) may influence the polarization state of the optical beams and their intensity. In order for the polarization state of the counterpropagating beams after one complete revolution in the cavity to be known precisely, the formalism of Jones matrices is used. This consists in representing the influence of a component on the polarization state by a 2×2 matrix referenced in a plane perpendicular to the propagation direction of the beams. In general, the axes of the chosen reference frame correspond to the principal axes of an intra-cavity polarizer, thereby simplifying the mathematical representation. To determine the resulting influence of all of the intra-cavity components, all that is then required is to determine the eigenstates of the product of the various matrices representative of these components. Since this product is not necessarily commutative, the influence may be different depending on the propagation direction of the beams.

In the example illustrated in FIG. 2b, the Jones matrix $M_{forward}$ of a cavity that includes the polarizer 71, the element 7 exhibiting a reciprocal effect and the element 8 exhibiting a nonreciprocal effect can be expressed in the forward direction as:

$$M_{forward} = \begin{pmatrix} \cos(\alpha + \beta) & 0 \\ \sin(\alpha + \beta) & 0 \end{pmatrix}$$

The resulting polarization after one complete turn is a linear polarization inclined at an angle α+β to the polarization axis of the polarizer and the intensity transmission through the polarizer is equal to $\cos(\alpha+\beta)^2$.

The Jones matrix $M_{reverse}$ of the same cavity, which includes the polarizer 71, the element 7 exhibiting a reciprocal effect and the element 8 exhibiting a nonreciprocal effect, is expressed in the reverse direction by:

$$M_{reverse} = \begin{pmatrix} \cos(-\alpha + \beta) & -\sin(-\alpha + \beta) \\ 0 & 0 \end{pmatrix}$$

The resulting polarization after one complete revolution is a linear polarization inclined at an angle −α+β to the polarization axis of the polarizer and the intensity transmission through the polarizer is equal to $\cos(-\alpha+\beta)^2$.

Figure 3:
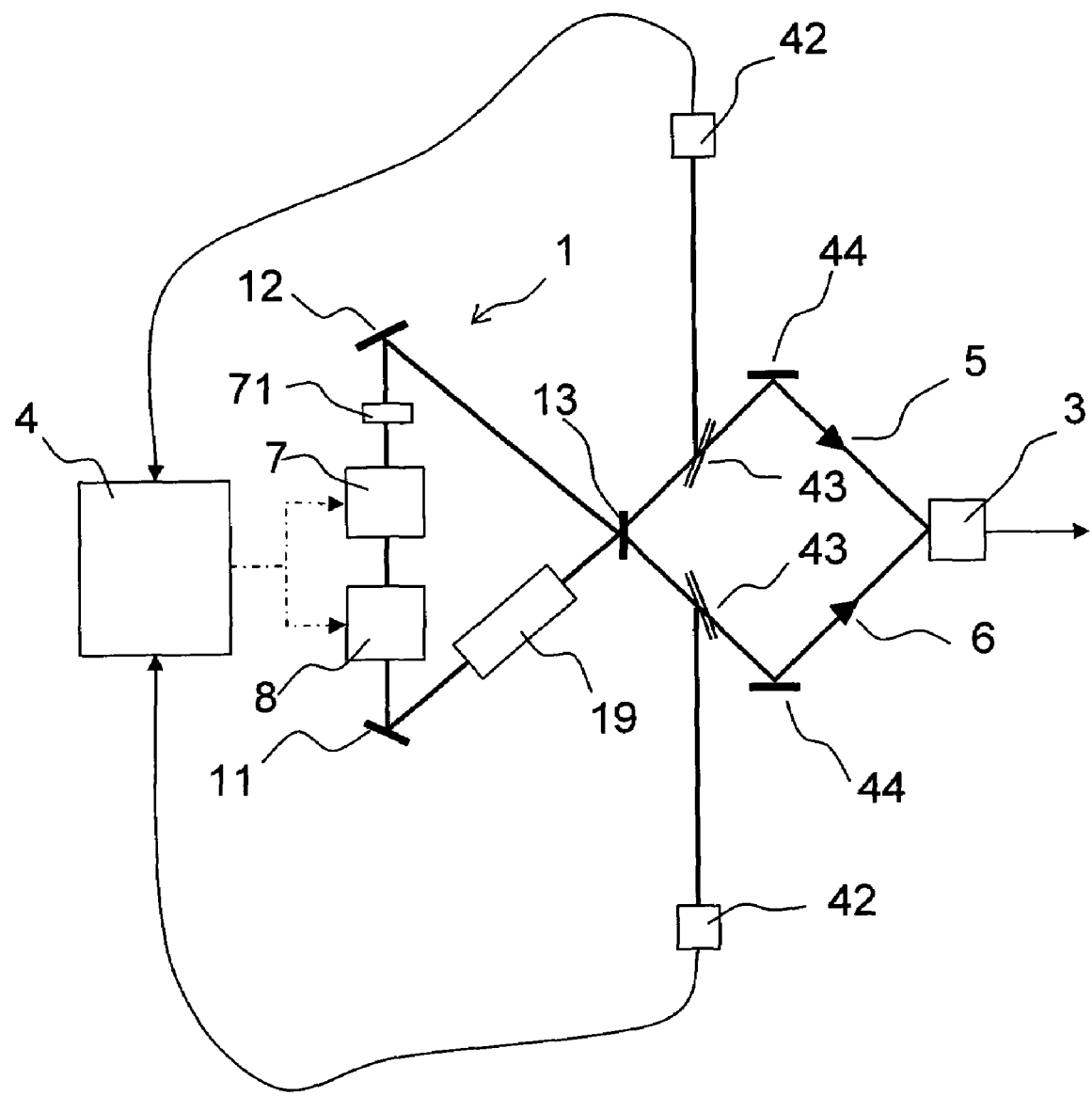
FIG. 3 shows the general diagram of the feedback device according to the invention.

FIG. 3 shows the diagram of an entire laser gyro according to the invention. It comprises a ring cavity 1 consisting of at least three mirrors 11, 12 and 13, a solid-state amplifying medium 19 and an optical assembly placed in the path of the counterpropagating optical modes 5 and 6, said assembly consisting of a polarizing element 7, a device 7 exhibiting a reciprocal effect acting on the polarization state of the counterpropagating modes and a device 8 exhibiting a nonreciprocal effect acting also on the polarization state of the counterpropagating modes, at least one of the effects of said devices being adjustable. At the output of the cavity, the two optical modes 5 and 6 are sent to a measurement photodiode 3. A portion of these beams 5 and 6 is taken off by means of the two semireflecting plates 43 and sent to the two photodetectors 42. The signals from these two photodetectors are representative of the light intensity of the two counterpropagating optical modes 5 and 6. Said signals are sent to an electronic feedback module 4 which controls, according to the intensity of the signals received, the device with the variable effect (dotted arrows in the diagram). This will result in variations in the polarization states of the two counterpropagating beams. These variations in polarization state thus cause different optical losses in the counterpropagating optical modes 5 and 6 each time that, after having made one complete revolution, the modes again pass through the polarizing element 71. These losses depend on the intensity of the output beams. If one of the beams has a higher light intensity than the other, its intensity will be more attenuated so as to bring the output beams to the same intensity level. Thus the bidirectional regime is intensity-stabilized.

Various types of polarizing element 71 exist. The polarizing element may especially be a linear polarizer. It may also be obtained by a treatment carried out on one of the cavity mirrors. It is also possible to use the reflection properties at the interface between two media having different indices, for example by placing, in the cavity, a glass plate inclined at the Brewster angle relative to the propagation direction of the modes 5 and 6, or by cutting one face of one of the elements in the cavity (especially the amplifying medium or the device exhibiting a nonreciprocal effect) at the Brewster angle of incidence.

Various methods exist for producing optical devices exhibiting a fixed reciprocal effect exist.

Figure 4A:
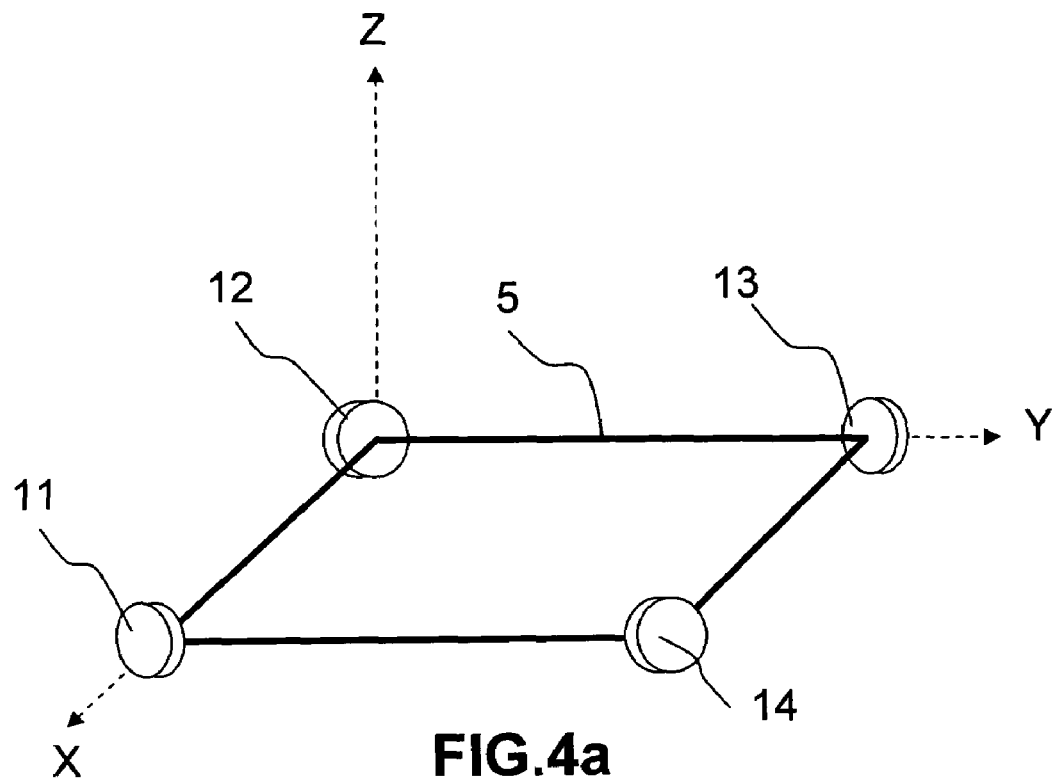
FIG. 4 shows the general principle of the reciprocal effect introduced by a nonplanar cavity.
Figure 4B:
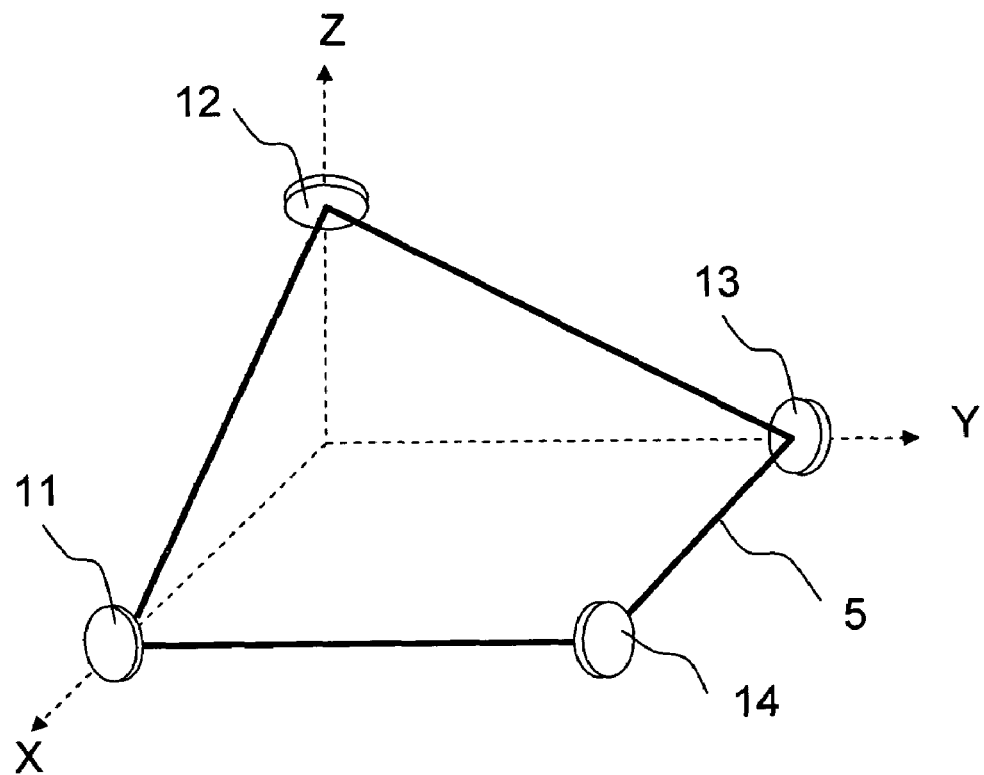

In particular, it is possible to use a nonplanar cavity as described in FIGS. 4a and 4b. Consider a cavity 1 having at least four mirrors 11, 12, 13 and 14, it is possible to place them, as indicated in FIG. 4a, in such a way that the counterpropagating beams propagate in one plane (the (X,Y) plane in FIG. 4a). In this case, the cavity induces no reciprocal rotation on the modes that propagate therein. It is also possible to place them in such a way that the counterpropagating beams no longer propagate in one plane, as indicated for example in FIG. 4b, in which the mirror 12 has been displaced along the Z axis. In this case, it has been demonstrated that the polarization direction of the counterpropagating beams has rotated through an angle that depends on the geometry of the cavity when the beam has made one complete revolution in the cavity (A. C. Nilsson, E. K. Gustafson and R. L. Byer, *Eigenpolarization Theory of Monolithic Nonplanar Ring Oscillators*, IEEE Journal of Quantum Electronics 25 (4), 767-790 (1989)). In other words, a nonplanar cavity can induce a reciprocal rotation effect on the modes propagating therein, this effect being fixed and dependent on the geometry of the cavity.

It is also possible to produce a device exhibiting a fixed reciprocal effect by adding a linear polarizer in the cavity, the polarization direction of said linear polarizer not being parallel to that of the initial polarizing element. In this case, the reciprocal rotation angle α is equal to the angle formed by the two axes of the polarizing elements.

Finally, it is possible to obtain the fixed reciprocal effect by adding a birefringent optical plate in the cavity. If this plate is a halfwave plate, the rotation angle α is then twice the angle made between the axis of the halfwave plate and that of the polarizing element. Of course, this halfwave plate may be integral with one of the mirrors of the cavity, so as to simplify the construction of the device.

To produce a device exhibiting a variable reciprocal effect, one possible solution consists in using a device exhibiting controllable birefringence. To induce controllable birefringence, it is possible to use:

lead, lanthanum, zirconium and titanium ceramics ($PB_{1-x}La_xZr_{1-y}Ti_yO_3$), the orientation of the neutral axes and the birefringence of which may both be controlled in a region by surrounding it with electrodes and applying an electric field of a few hundred volts. These ceramics have thicknesses of less than one millimeter, are transmissive in the near infrared, have control voltages of a few hundred volts, and a response time of the order of one microsecond, compatible with the necessary bandwidth determined to be a few tens of kHz;

liquid-crystal valves with a thickness of about one millimeter (the active zone of which has a thickness of about 20 microns) having control voltages of around 100 volts; or Pockels cells, the phase shift of which is modified by changing the applied voltage (typically 1 kV in order for the phase shift obtained to be equal to $\pi/2$). These cells, made of KDP or lithium niobate for example, are identical to those used for triggering a laser. They have thicknesses of one to two centimeters and zero insertion losses.

To produce a device exhibiting a nonreciprocal effect, it is general practice to use magnetooptic devices, for example devices exhibiting the Faraday effect, which, in order to operate, require the generation of a magnetic field. These Faraday effect elements may especially be produced directly on the cavity mirrors by means of layers of magnetooptic material. If it is desired to obtain a fixed nonreciprocal effect, all that is required is to generate a permanent magnetic field by means of magnet-based magnetic circuits. If it is desired to obtain a variable nonreciprocal effect, all that is then required is to create a variable magnetic field, for example by means of an induction coil surrounding the material exhibiting the Faraday effect.

When the medium so allows, it is advantageous to use the amplifying medium as the Faraday effect medium, thereby substantially simplifying the construction of the cavity. Thus, the neodymium-doped YAG, used as amplifying medium for lasers operating in the near infrared, is capable of generating a sufficient Faraday effect for it to be used as such. This is because its Vernet constant is equal to about $103° \ T^{-1}m^{-1}$, which is sufficient to induce Faraday rotations of the order of one degree for a thickness travel that does not exceed a few centimeters in the presence of a magnetic field of less than one tesla.

Figure 5:
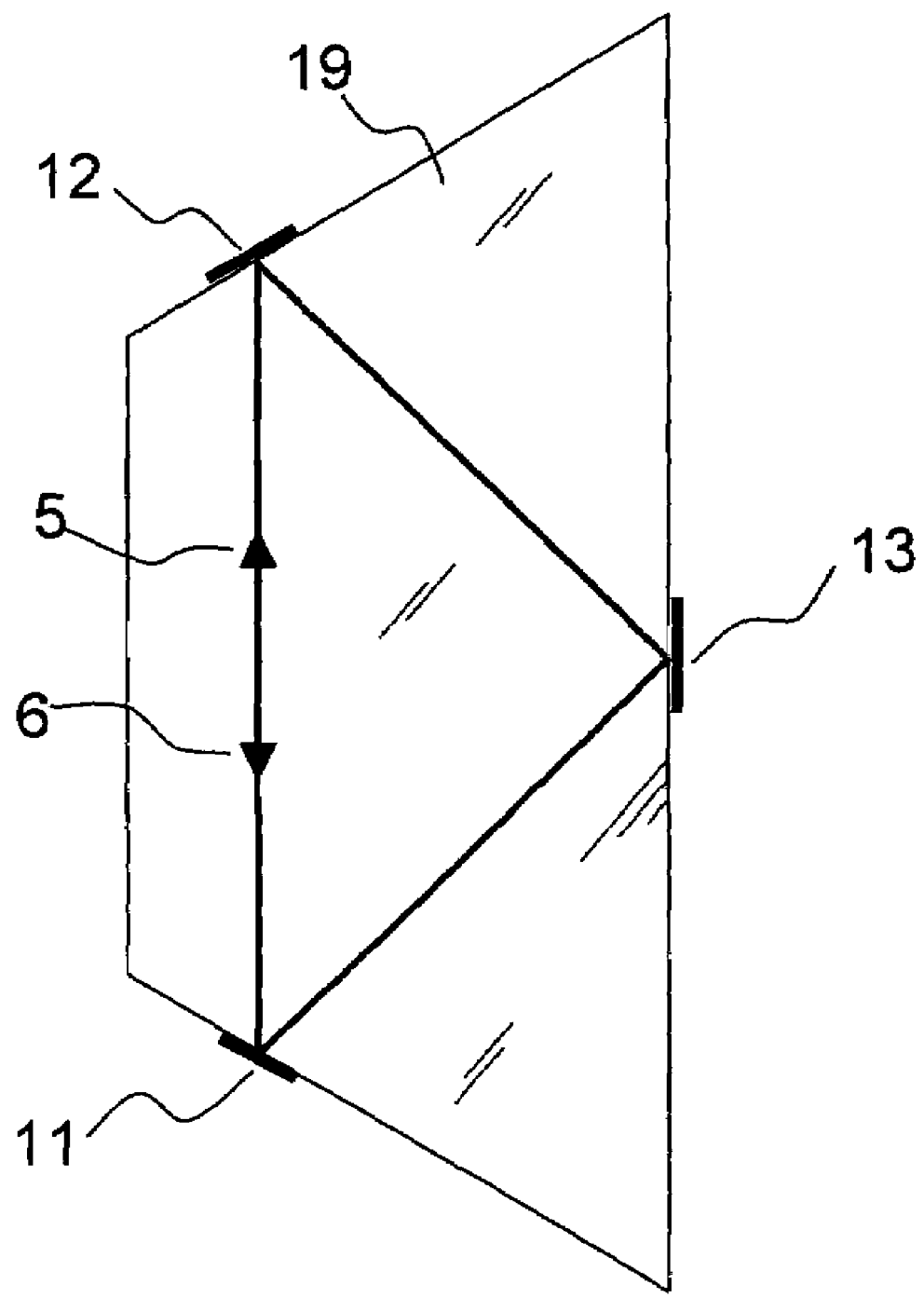
FIG. 5 shows the general view of a monolithic cavity.

Advantageously, a solid-state laser according to the invention is produced from a monolithic cavity as indicated in FIG. 5. This configuration has several advantages.

Figure 6:
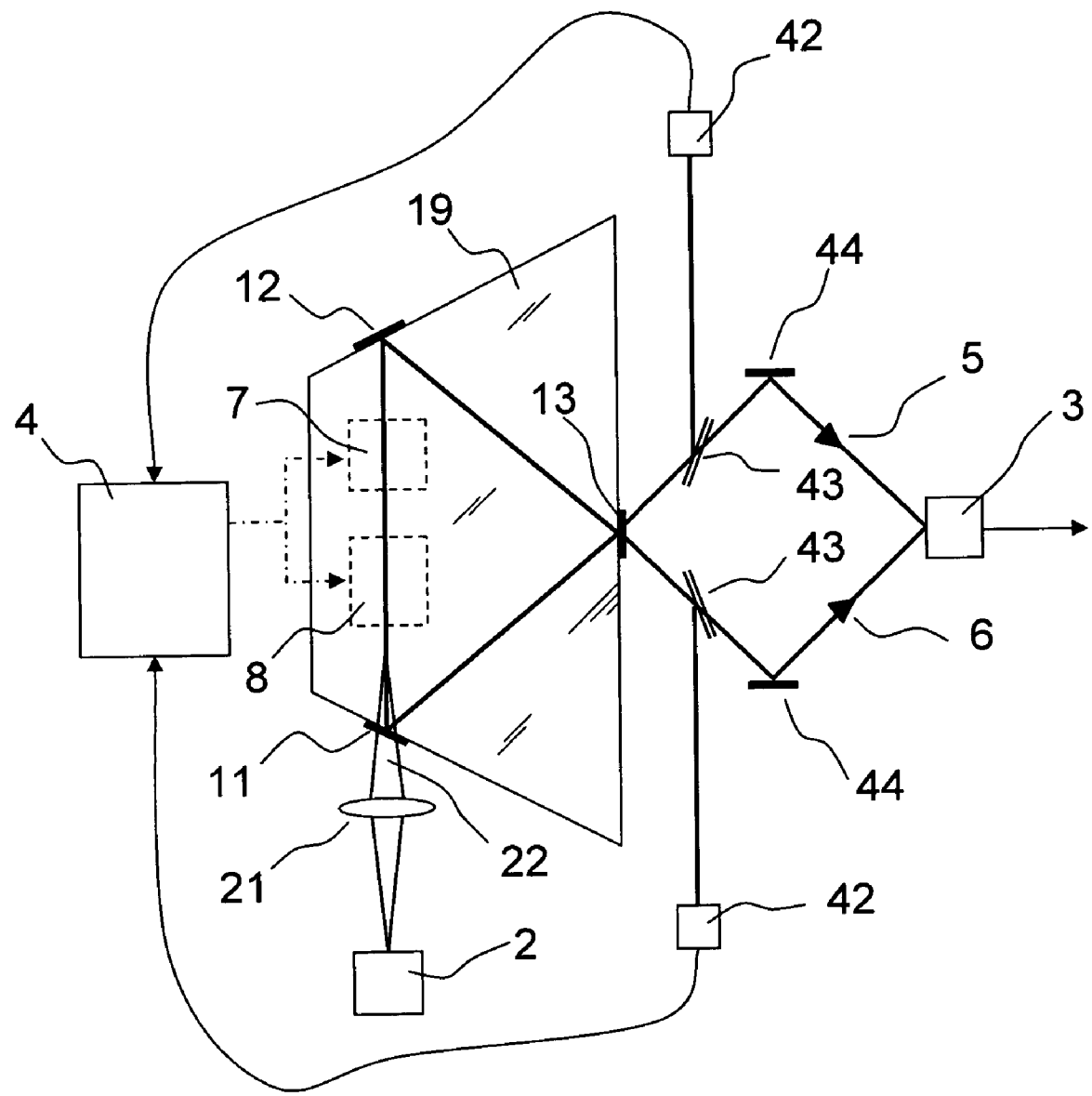
FIG. 6 shows the general view of a laser gyro that includes a monolithic cavity.

The cavity may then be produced directly in the material serving as amplifying medium. The faces of the cavity may be used as cavity mirrors or as faces for supporting the cavity mirrors, which makes the production operations easier and ensures greater geometrical stability and better resistance to thermal and vibratory environments. FIG. 6 shows a diagram of one embodiment of a laser gyro according to the invention using a cavity of this type. The mirrors 11, 12 and 13 are deposited directly on the faces of the monolithic cavity. The material 19 of the cavity also serves as amplifying medium. This material is especially based on neodymium-doped YAG (yttrium aluminum garnet). In this case, the optical pumping is carried out by means of a diode laser 2, the beam 22 of which is focused within the amplifying medium by means of a lens 21.

Figure 7:
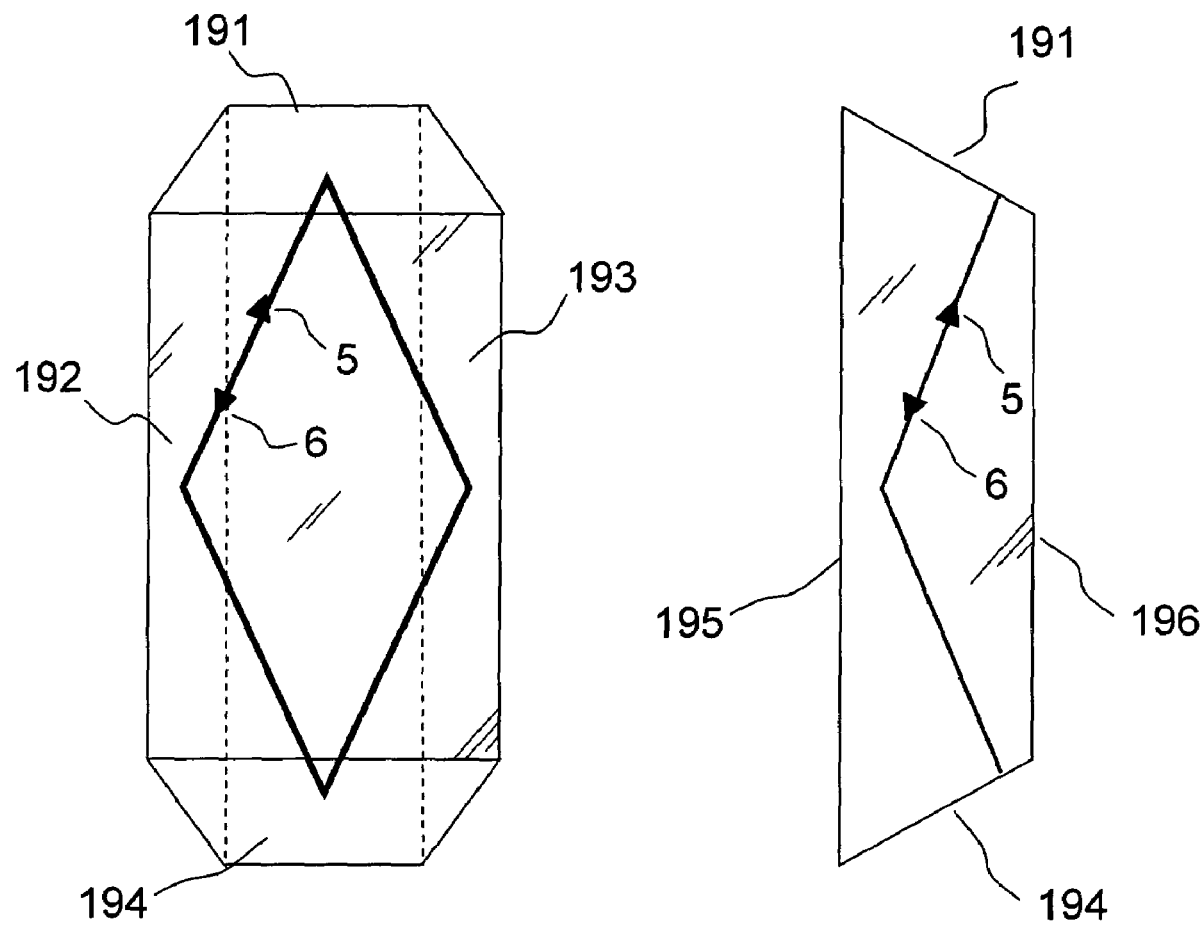
FIG. 7 shows the basic diagram of a monolithic nonplanar cavity.

The monolithic cavity may also be nonplanar, as indicated in FIG. 7. The reciprocal effect is thus obtained directly by the very shape of the cavity. In this example, the cavity is a thick plate having two plane parallel faces 195 and 196 and between them four inclined lateral faces 191, 192, 193 and 194. The general shape of the plate is that of a truncated wedge. The inclination of the lateral faces is chosen in such a way that light beams traveling through the cavity follow a broken rhombus as indicated in FIG. 7.

Figure 8A:
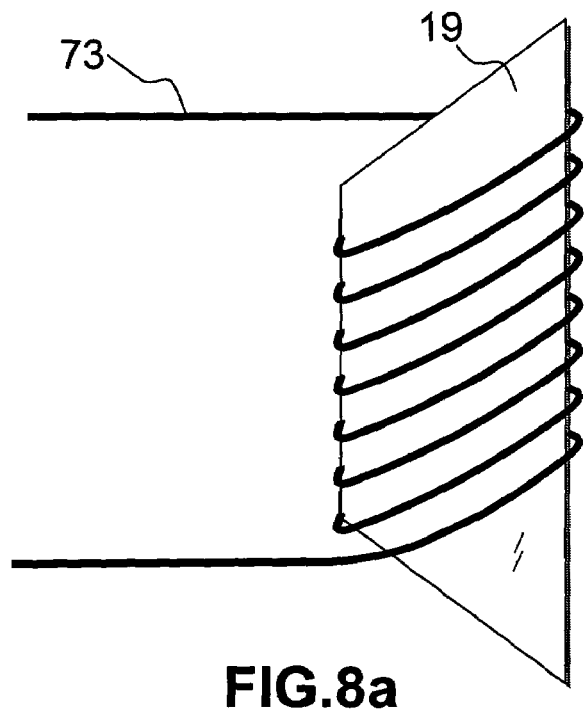
FIGS. 8a and 8b show basic diagrams of the creation of a variable magnetic field in a monolithic cavity exhibiting the Faraday effect.
Figure 8B:
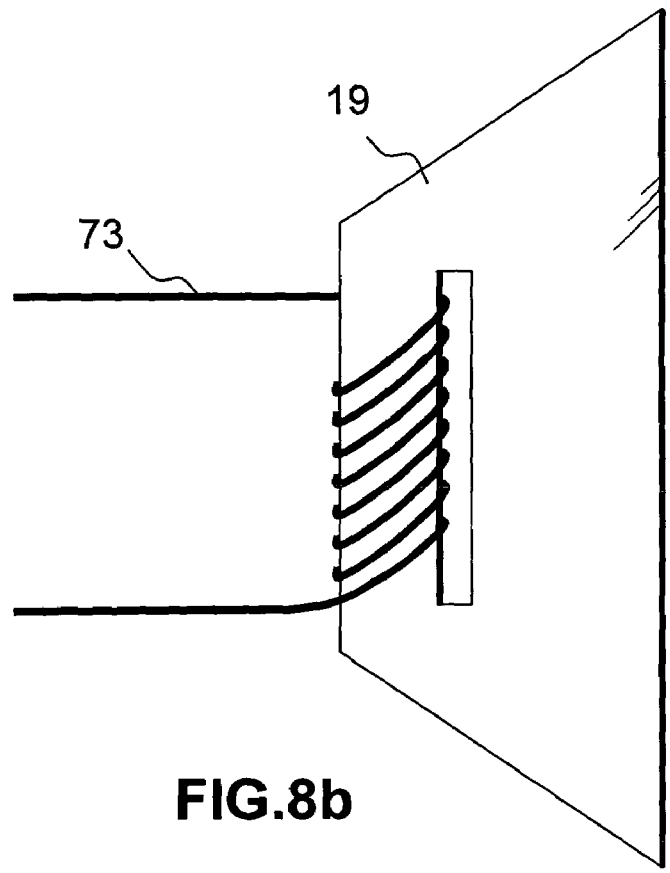

One of the other advantages of the monolithic cavity is that the amplifying medium 19 may be used as a medium exhibiting the Faraday effect. In this case, a variable magnetic field is obtained by winding an induction coil 73 around the monolithic cavity, as illustrated in FIG. 8a. To improve the effectiveness of the Faraday effect, it is also possible to wind one or more induction coils around only a portion of the cavity, as illustrated in FIG. 8b, so that the magnetic field is always parallel to the propagation direction. In this case, the cavity must be pierced in order to allow the electrical wires constituting the conduction coils to pass through it.

Figure 9:
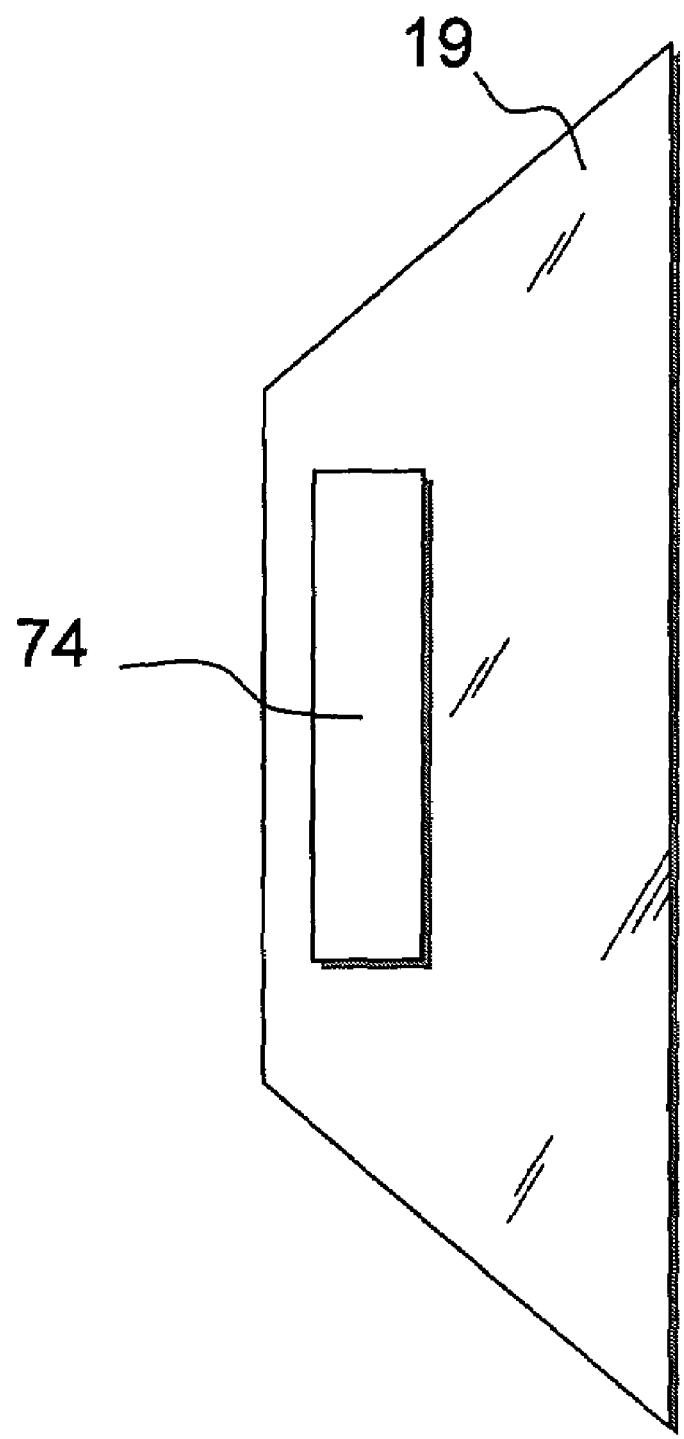
FIG. 9 shows the basic diagram of the creation of a fixed magnetic field in a monolithic cavity exhibiting the Faraday effect.

A fixed magnetic field may be obtained by placing permanent magnets 74 on the monolithic cavity as illustrated in FIG. 9.

Figure 10:
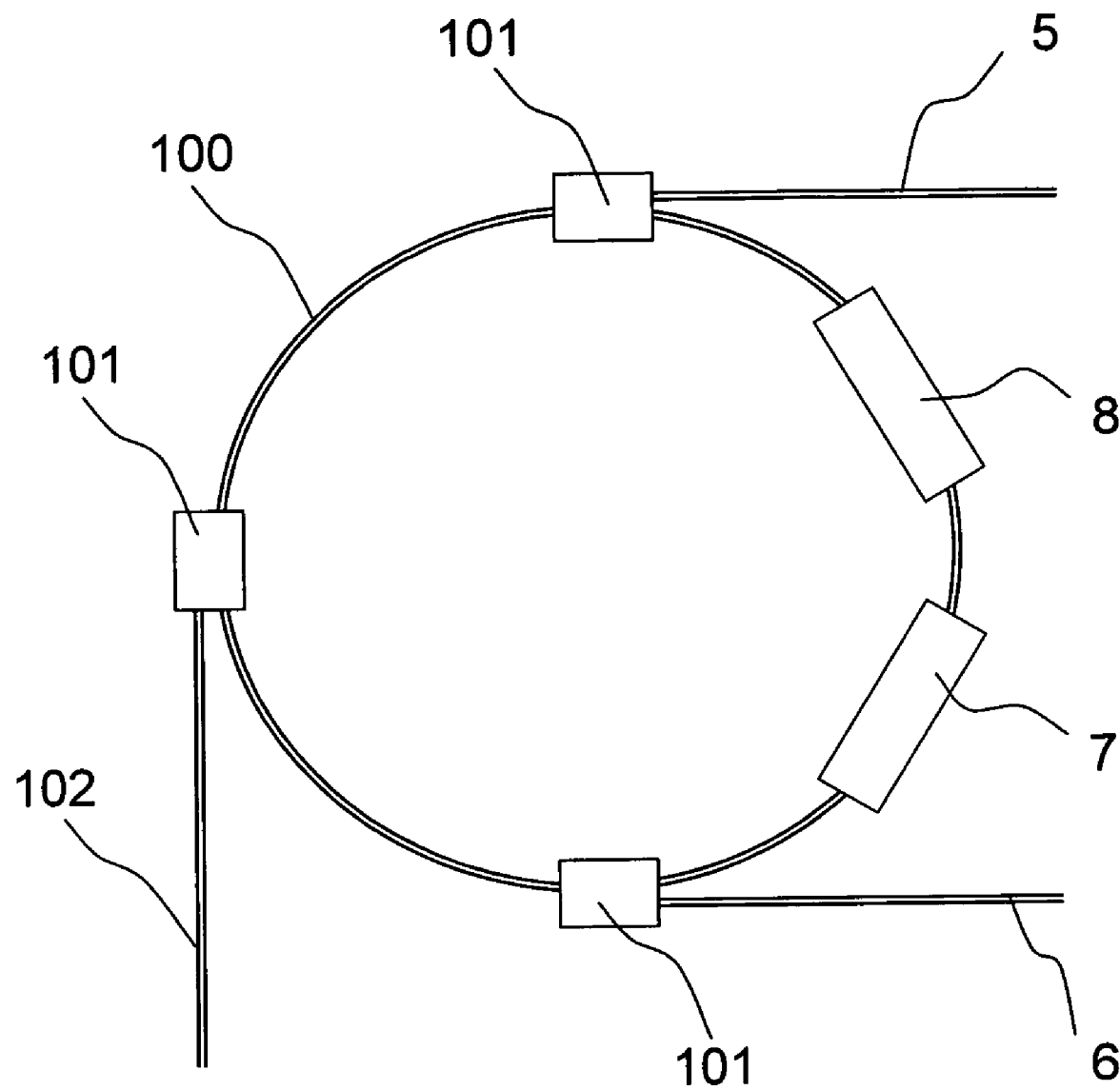
FIG. 10 shows the basic diagram of a laser gyro cavity produced from optical fibers.

It is also possible to produce a laser gyro according to the invention from a cavity consisting of optical fibers. FIG. 10 illustrates this principle in which the cavity essentially comprises an optical fiber 100 in the form of a ring, it being possible for the optical fiber to be partly doped in order to act as an amplifying medium. All fiber geometries may be envisioned, namely a single-core fiber, a double-core fiber (in order to facilitate coupling with the optical pump beam) or a polarization-maintaining fiber. Y couplers 101 are used to extract the two counterpropagating beams 5 and 6. A third coupler 101 is used to inject the optical pump beam 102 into the optical fiber. Several techniques, especially those developed for optical telecommunications, allow such coupling to be effected (for example, the V-groove technique). The optical pumping is carried out, for example, by a pump diode laser, not shown in FIG. 10.

The reciprocal optical effect may be obtained easily, for example by applying local mechanical deformations to the fiber, shown symbolically by the rectangle 7. The nonreciprocal effects may also be obtained by the Faraday effect, shown symbolically by the rectangle 8. Thanks to the development of telecommunication technologies, all-fiber Faraday isolators exist, with an input and output possessing a fiber-optic connector. These isolators include nonreciprocal elements that rotate the polarization direction of the linearly polarized light by 45°. These isolators may be modified in order to introduce a different nonreciprocal rotation, by modifying either their geometric characteristics or the magnetic fields that are applied to them.

The invention claimed is:

1. A laser gyro comprising:
an optical ring cavity including at least three mirrors,
a solid-state amplifying medium and a feedback system, the cavity and the amplifying medium being such that only two counterpropagating optical modes can propagate in opposite directions at the same time one with respect to the other inside said optical cavity, the feedback system allowing the intensity of the two counterpropagating modes to be kept almost the same, the feedback system comprising, inside the cavity, an optical assembly including:

a polarizing element, a device exhibiting a nonreciprocal effect that acts on the polarization state of the counterpropagating modes, that consists of a material exhibiting the Faraday effect and that is polarized by a permanent magnet, a device exhibiting a reciprocal effect that also acts on the polarization state of the counterpropagating modes, and wherein the feedback system comprises control means for adjusting the reciprocal effect of the device exhibiting a reciprocal effect.

2. The laser gyro as claimed in claim 1, wherein the polarizing element is a linear polarizer.

3. The laser gyro as claimed in claim 1, wherein the polarizing element is at least one of the mirrors of the cavity.

4. The laser gyro as claimed in claim 1, wherein the polarizing element is either an inclined glass plate, the angle of inclination on the optical modes then being approximately equal to the Brewster angle, or one of the faces of an element of the cavity cut at the Brewster angle of incidence.

5. The laser gyro as claimed in claim 1, wherein the device exhibiting a reciprocal effect is an optical plate exhibiting electrically controlled birefringence.

6. The laser gyro as claimed in claim 1, wherein the amplifying medium and the material exhibiting the Faraday effect are produced in the same material.

7. The laser gyro as claimed in claim 1, wherein the cavity is monolithic, the counterpropagating optical modes propagating, inside the cavity, only in a solid material.

8. The laser gyro as claimed in claim 1, wherein the amplifying medium is based on neodymium-doped YAG (yttrium-aluminum-garnet).

9. The laser gyro as claimed in claim 1, wherein the cavity is optically pumped by at least one diode laser.

10. The laser gyro as claimed in claim 1, wherein the cavity comprises at least one optical fiber in the form of a ring, which includes optical couplers for the entry and exit of the counterpropagating beams and of at least one optical pumping beam.

* * * * *

UNITED STATES PATENT AND TRADEMARK OFFICE
CERTIFICATE OF CORRECTION

PATENT NO. : 7,548,572 B2  Page 1 of 1
APPLICATION NO. : 10/550514
DATED : June 16, 2009
INVENTOR(S) : Sylvain Schwartz et al.

It is certified that error appears in the above-identified patent and that said Letters Patent is hereby corrected as shown below:

On the title page, the names of the inventors should read as follows:

Item (75) Inventors: Sylvain Schwartz, Paris (FR); Gilles Feugnet, Les Ulis (FR); Jean-Paul Pocholle, La Norville (FR)

Signed and Sealed this

Fourth Day of August, 2009

JOHN DOLL
*Acting Director of the United States Patent and Trademark Office*